(12) United States Patent
Golleb et al.

(10) Patent No.: US 8,147,912 B2
(45) Date of Patent: Apr. 3, 2012

(54) BRAKING BAND COMPOSITE STRUCTURE OF A BRAKE DISC

(75) Inventors: Ralf Siegfried Golleb, Bergamo (IT); Bernardino Mauri, Lecco (IT); Marco Orlandi, Seregno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 585 days.

(21) Appl. No.: 12/307,707

(22) PCT Filed: Jul. 13, 2007

(86) PCT No.: PCT/IT2007/000500
§ 371 (c)(1),
(2), (4) Date: Mar. 24, 2009

(87) PCT Pub. No.: WO2008/007411
PCT Pub. Date: Jan. 17, 2008

(65) Prior Publication Data
US 2009/0317642 A1 Dec. 24, 2009

(30) Foreign Application Priority Data
Jul. 14, 2006 (WO) .............. PCT/1T2006/000534

(51) Int. Cl.
*B05D 3/04* (2006.01)
*B05D 3/10* (2006.01)
*B05D 3/00* (2006.01)
*B32B 43/00* (2006.01)
*B32B 9/06* (2006.01)
*B32B 15/04* (2006.01)
*B65B 33/00* (2006.01)
*C09D 5/00* (2006.01)

(52) U.S. Cl. ........ 427/307; 427/140; 427/154; 427/299; 428/450

(58) Field of Classification Search .................. 205/109, 205/110, 208
See application file for complete search history.

(56) References Cited

U.S. PATENT DOCUMENTS

| 6,077,607 | A | 6/2000 | Zornik |
| 6,723,193 | B2 | 4/2004 | Martin |
| 6,818,085 | B2 | 11/2004 | Behr et al. |
| 2003/0004050 | A1 * | 1/2003 | Christ et al. .................. 501/88 |
| 2003/0196305 | A1 | 10/2003 | Kebbede et al. |

FOREIGN PATENT DOCUMENTS

| DE | 29610498 | 8/1996 |
| EP | 1211231 | 6/2002 |
| EP | 1273817 | 1/2003 |
| GB | 1311537 | 3/1973 |
| WO | 92/05292 | 4/1992 |
| WO | 01/72661 | 10/2001 |
| WO | 02/051771 | 7/2002 |
| WO | 03/012310 | 2/2003 |
| WO | 03/012311 | 2/2003 |

* cited by examiner

*Primary Examiner* — Michael Cleveland
*Assistant Examiner* — James M Mellott
(74) *Attorney, Agent, or Firm* — Shoemaker and Mattare

(57) ABSTRACT

A method for making a composite structure or a portion of a composite structure of a braking band of a brake disc, unusually capable of obtaining a structure with an especially long life, comprising at least the following steps:
 making a composite ceramic structure, comprising carbon fibre filaments, silicon and silicon carbides, obtaining a body of a braking band comprising at least one braking surface;
 processing said braking surface removing a surface layer so as to have carbon not bonded with the silicon on surface;
 removing at least partly the carbon not bonded with silicon from the surface;
 depositing an anchoring substrate on said braking surface; and
 depositing a protective coating on said anchoring substrate.

23 Claims, 9 Drawing Sheets

0,15 mm

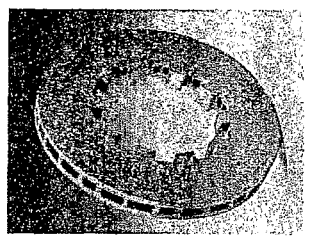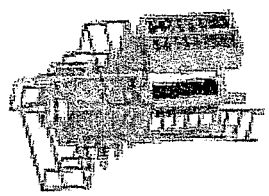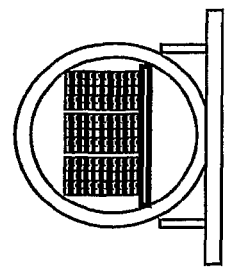
Figg. 17 - 19
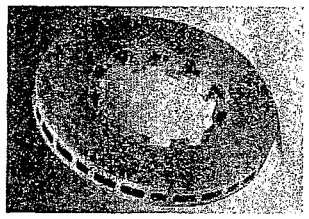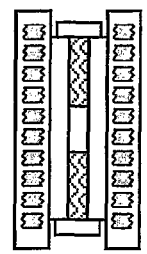
Figg. 14 - 16
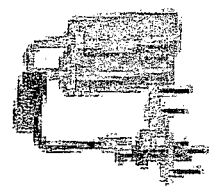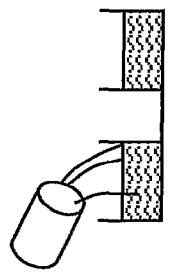
Figg. 11 - 13

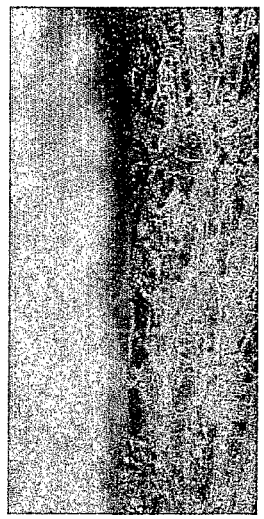
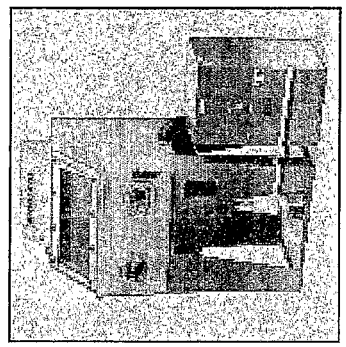
Figg. 25 - 26
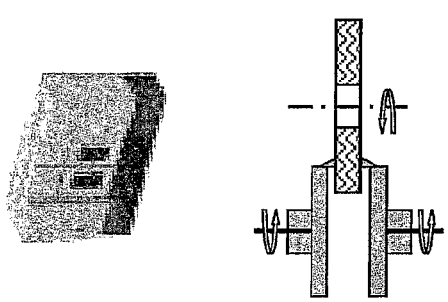
Figg. 23 - 24
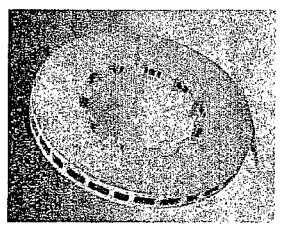
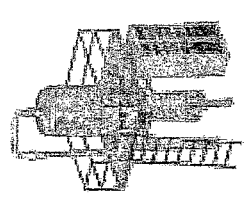
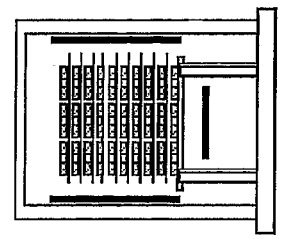
Figg. 20 - 22

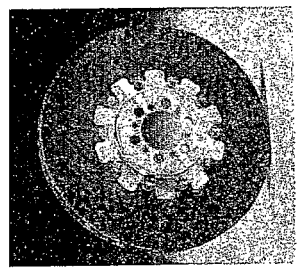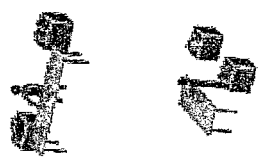
Figg. 32 – 33
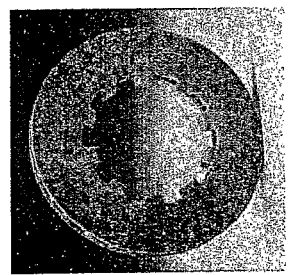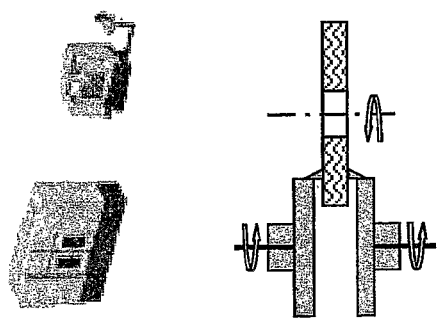
Figg. 29 – 31
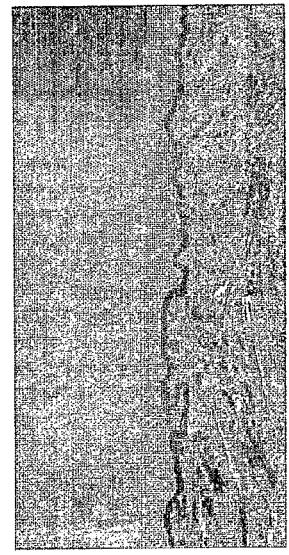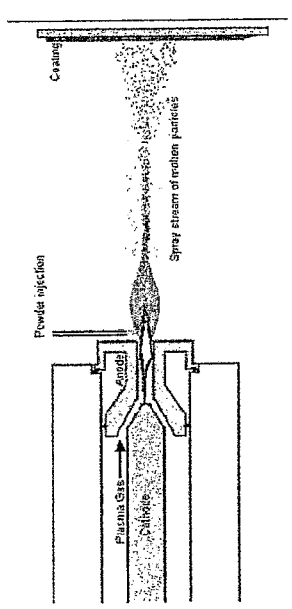
Fig. 27 – 28

BRAKING BAND COMPOSITE STRUCTURE OF A BRAKE DISC

The object of the present invention is a braking band composite structure of a brake disc.

In particular, the present invention refers to a method for producing a braking band composite structure of a brake disc and to the structure obtained with this method, to the braking band composite structure of a brake disc, and to the apparatus for carrying out the manufacturing method of a braking band composite structure of a brake disc.

BACKGROUND OF THE INVENTION

A braking band composite structure of a brake disc, particularly intended for a braking system of a brake disc of a vehicle, comprises an annular structure, or braking band, fixed to the rotating portion of a suspension of a vehicle, for example a wheel hub, and is provided with opposite braking surfaces suitable for cooperating with friction elements, or brake pads, seated in at least one calliper body arranged astride of such braking band and integral with a non-rotating component of the vehicle suspension. The controlled interaction between the opposite brake pads and the opposed braking surfaces of the braking band by friction determine a braking action which allows the deceleration or stop of the vehicle.

One of the major problems exhibited by the structures intended for the braking bands is that of extending the life of the braking surfaces.

As known, in fact, in the braking surfaces, especially in the braking surfaces of brake discs mounted on high performance or racing vehicles, tracks or other surface irregularities quickly create, for example due to the dirt or to the same friction material of the pads pulverized during the braking, which interpose between the braking surface and the pad during the braking action. These surface irregularities cause an irritating noise or rattle and a considerable increase of the wear of the disc and of the pad itself. In the practice, these disadvantages limit the braking disc life both for an inadequate service comfort and for excessive component wear.

The need of having a braking band of a brake disc with braking surfaces that besides being planar and parallel are smooth, that is, with a low surface roughness value, is therefore especially felt.

This problem is also felt in braking band structures of composite material, which are increasingly used on racing cars, but also on medium-high performance v vehicles.

In particular, this problem is felt in composite ceramic structures of braking bands of brake discs.

The term "composite ceramic structure" means all the structures obtained by:

carbonizing any mixture comprising resins, for example phenolic resins, graphite, for example in powder, and filaments or bundles of filaments of carbon fibers and densifying the resulting porous structure with silicon infiltrations, thus obtaining a structure or matrix comprising Carbon (C), Silicon (Si) and Silicon Carbide (SiC).

The opposite braking surfaces, suitably processed, of the braking band structure of these composite ceramic materials exhibit Silicon (Si), Silicon Carbide (SiC) and, buried or partly buried therein, bundles of carbon fibers (C). The braking surfaces of these Si and SiC structures therefore also exhibit Carbon fibers C exposed to oxidation.

In particular, these fibers are quickly oxidized when, during the braking action, the temperature of the friction surfaces increases, especially if an intense braking action, like that produced in a high performance vehicle, is produced.

As the carbon fibers exposed to oxidation burn, holes or tracks more or less quickly form onto the braking surface, which determine a quick reduction of the driving comfort, as well as a sudden increase of the pad wear.

Recently it has been tried to solve this problem by adding, at the braking surfaces, a surface layer which includes microfibers in place of the carbon filament bundles, in an attempt at forming, due to the burning thereof, holes or tracks of limited size and such as to reduce the rattle during the braking action.

An example of disc for brake disc of this type is described in U.S. Pat. No. 6,723,193 (Martin, Roland).

Despite being advantageous from several points of view, this solution allows reducing the above problem but it does not allow eliminating it.

In fact, despite the good mechanical features, the composite ceramic material described above in any case exhibits, as serious disadvantage, an unacceptable loss of free carbon from the braking surfaces which implies the forming of surface cavities. This disadvantage is caused by the tendency of the material, especially at high operating temperatures, to undergo such surface oxidation as to cause the surface loss of carbon based material.

Moreover, in the pas a solution has also been suggested wherein a monolithic SiC layer, for example of thickness variable between 0.2 mm and 5 mm is added to the Carbon (C) matrix, Si and SiC.

An example of composite structure of this type is described in U.S. Pat. No. 6,818,085 (Behr, Thomas et al.), and, only as regards to structures with Carbon-Carbon (C—C) body, in U.S. Pat. No. 6,077,607 (Zornik, Miklavz).

This solution, despite being advantageous from several points of view, is satisfactory until the material comprising carbon filaments located below the monolithic SiC layer burns due to the passage or infiltration of oxygen, infiltration which in any case (as experimentally proved) also occurs through the monolithic layer. Due to these burns that are substantially located in an area underneath the monolithic layer and substantially parallel to the braking surface, the monolithic layer starts to separate (raise or flake off), thus breaking (cracking), to then separate from the underlying matrix Dumping away) forming also large lowered areas that cause a drastic limitation of the disc life.

Moreover, in the industrial practice, these layers cannot be made thinner than 0.6 mm -1 mm. With these very high thicknesses, considerable surface tensions occur in the interface between the surface layer and the matrix containing carbon which favor an even more frequent forming of surface cracks.

GB 1,311,537 (Bendix Corporation) discloses the application of a coating on a C—C matrix. Also in this case, despite being advantageous from several points of view, the proposed solution implies a limitation to the operating temperature of the disc. For this known solution, the limit operating temperature is given by the temperature that leads to the burning of the C—C matrix (approximately close to 550° C.) in any case caused by the diffusion (even if limited) of oxygen into the structure, above which the coating layer separates or detaches from the underlying matrix (in the practice the surface layer flakes off). The main cause is related to the fact that even though these oxide layers described in GB 1,311,537 are dense, they allow the oxygen diffusion and thus the oxidation of the underlying material arranged in the separation surface between the coating and the matrix (it is common to find large oxidized areas in the interface plane between the coating and the matrix which with time lead to the coating separation, since the C—C subject to oxidation is present below the entire surface layer).

It is also known to coat a disc with an aluminum based metal matrix with a protective layer of few hundreds microns (for example alumina).

An example of this type of embodiment is described in WO 92/05292 (Murphy, Martin).

This solution allows a safe operation of the brake disc structure up to the melting temperature of the aluminum or of the aluminum based metal alloy matrix. As this temperature is exceeded, the coating layer detaches or flakes off as it loses a steady anchoring base to the matrix.

SUMMARY OF THE INVENTION

The object of the present invention is to devise and provide a process for making a braking band structure of a brake disc which should allow meeting the above requirement while allowing obviating the disadvantages mentioned above.

Such object is achieved by a process for making a braking band structure of a brake disc of the type specified above, as described in claim 1 below.

BRIEF DESCRIPTION OF THE DRAWINGS

Further features and advantages of the process according to the invention will appear more clearly from the following description of some preferred embodiments thereof, given by way of a non-limiting example with reference to the annexed figures, wherein:

FIGS. 11 to 13 show the manufacturing process step of the braking band depicting the mixing and filling of a forming mould;

FIGS. 14 to 16 show the hot forming step of the green body;

FIGS. 17 to 19 show the pyrolysis step of a plurality of braking band bodies;

FIGS. 20 to 22 show the silication step of a plurality of braking band bodies;

FIGS. 23 to 24 show the mechanical processing step of the braking surfaces of the silication densified body of a braking band;

FIGS. 25 and 26 shows a cleaning step with abrasive jet of the braking surfaces for removing the carbon phase from the braking surface;

FIGS. 27 and 28 schematically show the steps of plasma deposition of an anchoring substrate and of plasma deposition of a protective layer on the braking surfaces previously cleaned of the carbon by a predetermined depth;

FIGS. 29 to 31 show the mechanical finishing process step of the braking surface;

FIGS. 32 and 33 show the assembly step of the braking band to a bell; and

DETAILED DESCRIPTION OF THE PREFERRED EMBODIMENTS

A disc for a disc brake 1 comprises a braking band 2 suitable for cooperating with brake calipers for exerting a braking action on a vehicle.

Figure 10:
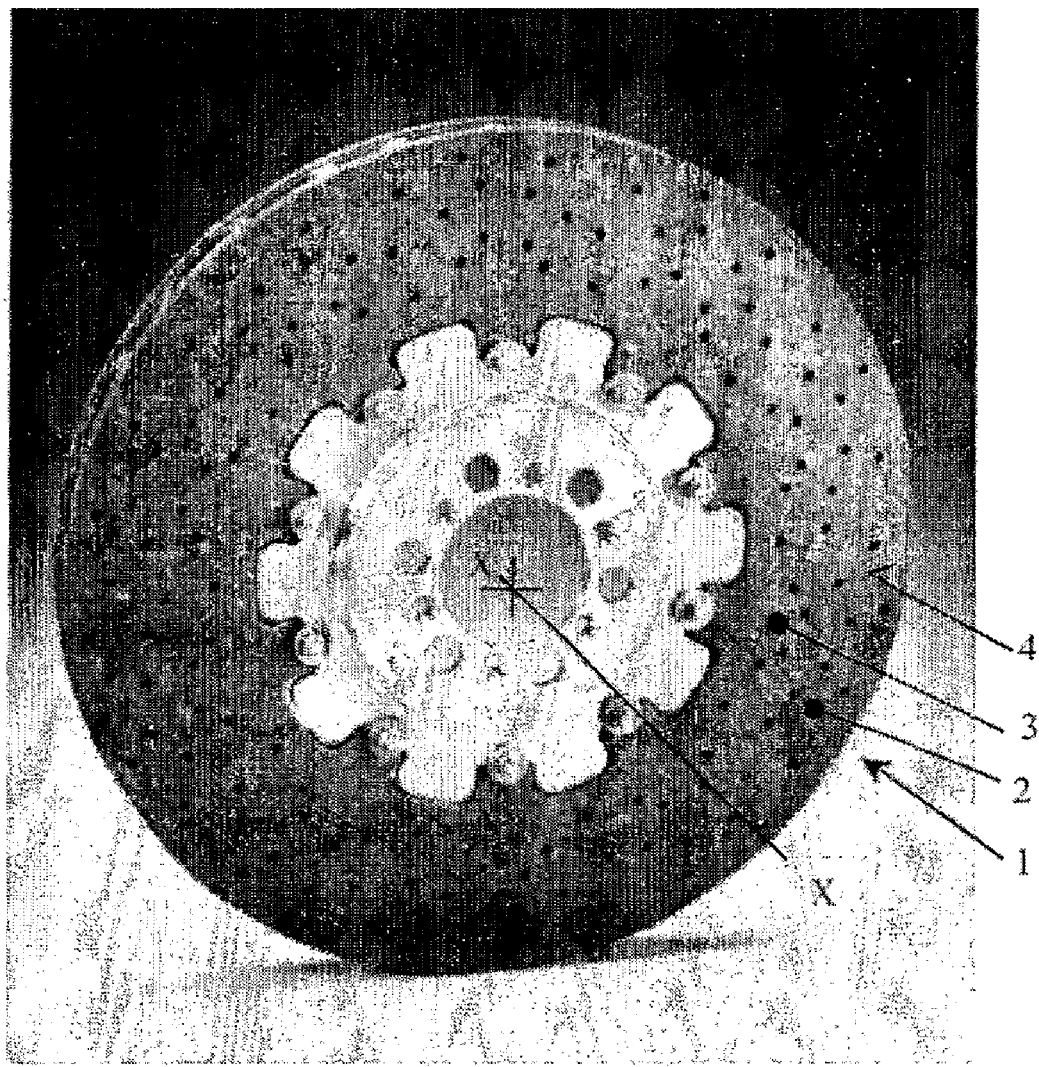
FIG. 10 shows a disc for a disc brake with a braking band superficially finished in the braking surfaces thereof and assembled to a traction bell.

With reference to FIG. 10, the above braking band comprises a body 3 which extends about a symmetry axis X-X and is laterally delimited by braking surfaces 4.

In accordance with an embodiment, said body is of a shaped composite material based on carbon/silicon carbide (hereinafter "C/SiC") and containing filaments essentially consisting of carbon.

Advantageously, said body comprises a porous structure or matrix of carbon infiltrated with silicon for forming silicon carbide and excess silicon, as well as residual carbon.

Preferably, said body is obtained by the interaction of a mixture, comprising filament bundles essentially consisting of carbon, with silicon at a temperature sufficient for causing the melting of the latter.

The term "filaments essentially consisting of carbon" is intended to include fibrous materials obtained by pyrolysis of different products of a synthetic origin, for example polyacrylonitrile (PAN) and polysilazane, or of natural origin, such as pitches, natural sources based on cellulose such as vegetal fibers and wood.

The term "filament bundles" is intended to comprise sets of filaments variable from 3000 to 50000 units and having a diameter comprised between 2 and 310 µm, preferably 7 µm associated to each other and preferably, impregnated with a resin, for example polyurethane.

Advantageously, said bundles are broken, so as to have a length shorter than 30 mm, preferably variable from 10 to 8 mm, and are casually arranged into the mixture.

These filament bundles casually arranged are defined on the basis of the number of component units of the bundle, for example 3K, 10K, 50K respectively correspond to 3000, 10000 and 50000 units, and so on.

According to the invention, the process for making a braking band composite structure of a brake disc comprises the following operating steps:
  making a composite ceramic structure, comprising silicon, silicon carbides and carbon not bonded with silicon, obtaining a body of a braking band 3 comprising at least one braking surface 4, said carbon not bonded with silicon being present substantially in the form of carbon fiber filaments;
  processing said braking surface removing a surface layer so as to have said carbon not bonded with the silicon on the surface;
  removing at least partly and mainly selectively the carbon not bonded with the silicon from the surface, leaving silicon and silicon carbides; and
  depositing a protective layer on said surface from which at least partly and mainly selectively the carbon not bonded with the silicon has been removed, As explained in the description below, the expression "removing at least partly and mainly selectively the carbon not bonded with the silicon from the surface, leaving silicon and silicon carbides" means that the removal will be carried out so that the silicon and the silicon carbides are either not removed (for example removal by combustion) or are removed only as a minimal part (for example, removal by abrasive jet with powders suitably selected in composition and grain size capable of removing the carbon not bonded with silicon much more than the bonded carbon, for example in the form of silicon carbides).

According to a preferred solution, the process for making a braking band composite structure of a brake disc comprises the following operating steps:
  manufacture of the composite ceramic structure of the braking band body;
  mechanical processing of the above body for removing a surface layer of the braking surface exposing carbon fibers substantially buried in the body matrix, advantageously but not necessarily obtaining two opposite braking surfaces planar and parallel to one another;
  removal of the surface carbon not bonded with the silicon from the above braking surfaces;
  deposition of an anchoring substrate on the above braking surfaces; and
  deposition of a protective coating on the above anchoring substrate; and
  mechanical finishing of the above braking surfaces.

Advantageously, the mechanical finishing step allows obtaining at least one of the following advantages:
  reduction of the thickness of the protective coating layer;
  predetermined surface roughness value;
  planarity of the braking surface;
  parallelism between the opposite braking surfaces;
  drilling of the braking surface.

Preferably, the mechanical finishing step is followed by an assembling step of the braking band to a support and traction bell for the connection of the braking disc thus obtained to a vehicle.

Preferably, the manufacturing step of the composite ceramic structure of the braking band body envisages at least the following sub-steps:
  preparing a mixture comprising at least carbon fiber filaments and at least one organic binder;
  forming the above mixture in a mould for obtaining a shaped body;
  pyrolysing the shaped body for obtaining a porous carbon structure;
  infiltrating the carbon structure with silicon for obtaining the above composite ceramic structure substantially based on carbon, silicon and silicon carbides.

Preferably, the process according to the invention can provide a step of drilling of the braking surface. Such step may be carried out between the forming step and the pyrolysis step, or in alternative between the pyrolysis step and the silicon infiltration step.

Advantageously, the drilling step can also be carried out after the above processing step of the braking surface.

Preferably, the silicon infiltration step is followed by a step of deposition on an anti-oxidant material layer on the entire surface of the shaped body, hereinafter called impregnation step.

* * *

Advantageously, a mixture is prepared in the above preparation step that comprises 40% to 80% of carbon fiber filaments by volume on the mixture volume, and preferably from 40 to 50% and from 60% to 70%.

Advantageously, the carbon fiber filaments comprise fibrous materials obtained by pyrolysis of organic compounds.

Advantageously, the above filaments have a diameter comprised between 2 and 10 μm. Preferably, such filaments have a length comprised between 0.1 mm and 10 mm.

Advantageously, the filament can be gathered into bundles with a variable number of filaments preferably comprised between 3000 and 5000 units. Such bundles may have a length below 30 mm, and preferably comprised between 10 and 8 mm. The diameter of such bundles may be comprised between 0.1 mm and 2 mm, preferably between 0.3 mm and 0.5 mm.

Preferably, the mixture comprises from 5% to 50% of organic binder by volume on the mixture volume, and preferably from 20 to 26 % and from 40% to 50%. Operatively, the organic binder is added to the mixture at the solid, semi-liquid or liquid state.

Advantageously, the organic binder comprises one or more compounds selected from the group comprising phenolic resin, acrylic resin, paraffin, pitches and polystyrenes.

According to a particular solution, the organic binder is a phenolic resin dissolved in an organic solvent, preferably furfuryl alcohol.

Advantageously, the mixture may comprise from 0.5% to 30% of additives by volume of mixture, and preferably from 4% to 15% Such additives in particular comprise one or more powder compounds selected from the group comprising graphite, silicon carbide, metal carbides and metal nitrides.

Advantageously, the mixture may comprise from 4% to 30% of reinforcing fibers by volume on the mixture volume, and preferably from 10% to 20% In particular, such reinforcing fibers may be fibers of compounds selected from the group comprising carbon, silicon carbide (SiC), silicon nitride (Si3N4) and titanium carbide (TiC). According to a particular solution, the above reinforcing fibers can be fibers of metals having melting temperatures higher than that of silicon.

According to a particular embodiment, the reinforcing fibers are arranged in annular portions of the end composite structure. Advantageously, the reinforcing fibers can be sorted into a plurality of bundles arranged according to predetermined directions, or in conjunction or separated, they can form a fabric and/or an unwoven fabric. Optionally, the reinforcing fibers can be arranged into different layers of the composite structure.

In particular, the carbon filaments and/or the reinforcing fibers can also be coated with the above organic binder, or in conjunction or separated with a protective resin, preferably polyurethane.

\* \* \*

The step of preparation of a mixture is followed by the forming step.

Preferably, the forming step is carried out at a temperature comprised within the range between 80° C. and 180° C. In particular, the forming is carried out at a pressure comprised in the range between 10 bar and 50 bar. Preferably, the forming is continued for a period of time comprised between 30 min and 5 hours.

\* \* \*

The forming step is followed by the pyrolysis step, which is carried out before the above silicon infiltration step.

Advantageously, the pyrolysis step is carried out at a temperature comprised within the range between 850° C. and 1250° C., and preferably between 950° C. and 1100° C. In particular, the pyrolysis is carried out with an overpressure comprised in the range between 2 mbar and 100 mbar.

According to a particular solution, the pyrolysis step is carried out in inert atmosphere, preferably of argon.

Advantageously, the pyrolysis step is carried out for a time variable between 12 hours and 150 hours, preferably between 24 hours and 48 hours.

\* \* \*

The silicon infiltration step, subsequent to the pyrolysis step, is carried out at a temperature comprised within the range between 1450° C. and 2200° C., and preferably within the range between 1600° C. and 1750° C.

In particular, the silicon infiltration step is carried out in a vacuum, with a residual pressure comprised within the range between 0.1 mbar and 10 mbar, and preferably within the range between 0.3 mbar and 2 mbar.

Preferably, the silicon infiltration step is carried out for a period of time variable between 10 min and 8 hours.

According to a particular solution, the silicon infiltration step is carried out by placing the porous carbon structure obtained by pyrolysis in a silicon granule bed.

At the end of the silicon infiltration step, the composite ceramic structure exhibits at least one surface layer comprising silicon carbide and silicon phases wherein carbon fiber filaments are buried. In particular, the composite ceramic structure exhibits a continuous film comprising silicon on the surface.

\* \* \*

In accordance with a first embodiment of the process, in the above mixture preparation step, carbon filament bundles with at least one organic binder are mixed with one another.

Advantageously, the filament bundles can have a diameter from 0.1 mm to 2 mm, preferably from 0.3 mm to 0.5 mm.

Advantageously, the content of filament bundles in the mixture can vary from 40% to 80% by volume on the volume of the mixture and preferably it is within the range between 40% and 50% or within the range between 60% and 70%.

The organic binder is a conventional binder which can be chosen from the group comprising phenolic and acrylic resins, paraffin, pitches, polystyrenes, etc.

Preferably, the binder is chosen from the group comprising pitches and phenolic resins.

The binder can be added to the mixture in any desired form, for example at the solid, semi-liquid, liquid state or in solution.

For example, the phenolic resin can be added in the form of pellets, powder or grains.

Advantageously, the content of organic binder in the mixture can vary from 5% to 3,050% by volume on the volume of the mixture and preferably is within the range between 20% -26% or 40% and 50%.

The mixture may also contain other conventional additives used as fillers and, indirectly, for regulating the porosity and the density of the composite structure.

Such additives consist of particles of inorganic materials such as preferably graphite powder, silicon carbide, metal nitrides and carbides.

Advantageously, the content of additives in the mixture can vary from 0.5% to 30% by volume on the volume of the mixture and preferably is comprised within the range of 4% -15%.

The mixing can be carried out with conventional equipment and methods and the above filament bundles will casually arrange in the different directions.

The mixture thus obtained is then arranged in a mould where it is formed by heating and application of a pressure, obtaining a shaped body.

Advantageously, in the forming step, the mixture is heated in the mould at a temperature from 80° C. to 180° C., preferably 100-120° C. and a pressure comprised between 10 bar and 50 bar, preferably between 20 bar and 30 bar, is applied thereon.

The shaped and compact body thus obtained is extracted from the mould and then subject to a first firing having the purpose of carbonizing the chemical binder (pyrolysis).

Such firing, for example, is carried out in a conventional furnace at a temperature that substantially depends on the type of binder used and that is generally comprised within the range of 900-1200° C.

The firing is carried out in the presence of a flow of inert gas such as nitrogen or argon and with an overpressure comprised within the range between 2 mbar and 100 mbar, preferably between 20 and 30 mbar. The above flow also advantageously allows removing the gases released from the pyrolysis of the chemical binder.

By effect of such first firing (pyrolysis), the semi-finished product gains certain porosity due to the loss of volatile material at the carbonization or pyrolysis temperatures and transforms into a porous carbon structure.

Advantageously, a finishing step of the surface of the shaped body can be further envisaged at the end of the pyrolysis firing. This advantageously allows removing any surface deformations of the body by conventional equipment, so as to obtain the desired shape.

The finishing operation is preferably carried out in a dry manner, for example with diamond tools.

After that, the porous carbon structure is subject to a second firing in the presence of silicon (silicon infiltration) at such a temperature as to cause the silicon melting and the infiltration of the latter into the pores of the above structure, thus obtaining a composite ceramic structure.

To carry out the second firing, the paralyzed shaped body is introduced into the chamber of a container with a volume about twice the volume of the body itself, filling the air space formed between the body and the silicon container, which encloses the semi-finished product. Thus, the quantity of silicon used is that required, or a bit higher, for filling the porosities of the semi-finished product.

Pure silicon or an alloy of silicon and aluminum or copper, in grains or powder, is used for filling the above air space.

The chamber may be in communication with the exterior through suitable holes that allow the escape of the gases released during the firing.

After loading the silicon, the container is introduced into a special furnace, in se conventional, heated at a temperature of 1400-1700° C. At the above temperatures, the silicon melts and infiltrates into the pores of the semi-finished product.

The firing is carried out at a vacuum, with a residual pressure comprised between 0.1 mbar and 10 mbar, preferably between 0.3 and 2 mbar.

At the end of the firing, the composite material is cooled for example with argon or, preferably, with nitrogen, so that the residual silicon solidifies into little balls easy to recover from the container.

The silicon infiltration allows increasing the cohesion of the carbon filament bundles, while at the same time the fused silicon, in the conditions of the second firing, partly reacts with the carbon of the semi-finished product forming silicon carbides that have the effect of improving the cohesion characteristics of the material.

At the end of this step, the semi-finished product will also exhibit a silicon layer like a skin coating the entire outer surface thereof.

Advantageously, the firing steps in the furnace, that is, pyrolysis and silication, could take place in a single furnace, allowing the reduction of times and complexity of the manufacturing equipment.

* * *

In accordance with a second embodiment of the process according to the invention, the manufacture of the composite ceramic structure of the braking band body envisages that a plurality of reinforcing fibers is incorporated in the mixture of filaments and organic binder. Such fibers are arranged so that they extend along the profile of said body for impeding the propagation of cracks.

Advantageously, these reinforcing fibers exhibit a length of more than 25 mm and preferably of more than 35 mm. For example, these reinforcing fibers extend along the entire profile of the geometrical area of likely formation of cracks and/or flaws, such as seat shaped areas for connecting the braking band to the bell.

The content of the composite material components may vary in percentages by volume on the volume of the material, for example, as follows:
  filament bundles 40-70%, preferably 50-60%;
  binder 5-30%, preferably 15-25%;
  additives 0.5-20%, preferably 1-15%;
  reinforcing fibers 4-30%, preferably 10-20%;

Advantageously, the reinforcing fibers are arranged in the mixture of filaments and binder directly into the mould, prior to the forming step.

Advantageously, such reinforcing fibers can bed arranged along annular portions, for example increasing, of said disc, for example and preferably in the proximity of the inner connecting diameter between the braking band and the bell.

Advantageously, the reinforcing fibers are substantially inert on the composite component and have a sufficient resistance at the silicon infiltration and pyrolysis temperatures for preventing them from degrading during the preparation of the component material of the disc.

To this end, the material of the reinforcing fibers preferably consists of carbon fibers. In any case it is possible to use other materials such as SiC, Si3N4, TiC, as well as metal materials, for example platinum, suitable for standing the temperatures of interaction with silicon.

The reinforcing fibers can be incorporated in the material in various ways. For example, the reinforcing fibers can be sorted into a plurality of bundles that are arranged according to predetermined directions.

Such directions can for example be weft and warp directions, said bundles forming a fabric, for example advantageously suitable for coating the entire area concerned by the crack formation and/or propagation.

As an alternative, the reinforcing fibers can make a spun-bonded fabric, for example a felt.

The reinforcing fibers can further form one or more inner layers of the disc body, layers that advantageously but in a non-limiting manner can be parallel to at least one of the braking surfaces and/or transversal to at least one braking surface.

The filament bundles and/or the reinforcing fibers can be coated in advance with a protective resin, preferably polyurethane, before being used in accordance with the process described above.

As an alternative, the filament bundles and the reinforcing fibers can be coated in advance with the same organic binder used to prepare the mixture.

In this way, a higher cohesion of the material and a more compact product are obtained.

During the pyrolysis of the shaped body, the resin and the organic binder carbonize creating a protective layer on the filament bundles and on the reinforcing fibers, preventing any disgregation thereof or even dissolution in the subsequent treatment with silicon.

In this way, the filament bundles and the reinforcing fibers keep their original shape in the entire process thus obtaining a material with good cohesion and resistance characteristics.

Advantageously, the incorporation of the reinforcing fibers in the mixture can take place in different ways.

According to a preferred embodiment, such incorporation is carried out according to the steps of:
  i) arranging a first layer of said mixture along the profile of said mould;
  ii) adding on said first layer of mixture said plurality of reinforcing fibers that extend along said profile so as to impede the propagation of cracks;
  iii) arranging a second layer of said mixture on said first layer so as to completely cover said plurality of reinforcing fibers.

The stratification operations described above can be repeated a predetermined number of times so as to obtain a multi-layer composite material wherein each layer of reinforcing fibers is incorporated between two layers of mixture comprising filament bundles.

The reinforcing fibers can be added to the mixture in the form of a plurality of bundles that are arranged according to predetermined directions.

Such predetermined directions can for example be weft and warp directions, said bundles thus forming a fabric. As an alternative, multiple bundles of reinforcing fiber associated or woven to each other form a single weft or warp thread for making said fabric.

The fabric can for example comprise 2 to 30 reinforcing fibers per cm, preferably 5-8 fibers/cm.

As an alternative, the reinforcing fibers can make a non-woven fabric, for example a felt.

The quantity of reinforcing fibers incorporated in the mixture is function of the desired content of reinforcing fibers in the end composite material, said content being comprised for example within the range 4-30% by volume on the volume of the material, preferably 10-20%.

EXAMPLE 1

Below is an example of preparation of the composite material according to the above second embodiment of the process for making a braking band composite structure of a brake disc according to the invention.

A mixture containing (percentages by volume referred to the mixture volume) 65% of carbon filament bundles, having diameters comprised between 0.3 mm and 0.5 mm and lengths from 5 mm to 10 mm, 23% of dry phenolic resin, and 12% of SiC powder was prepared with a mixer of known type, for example an Eirich mixer.

The mixing allowed obtaining a casual distribution of the filament bundles.

A portion of the mixture was then arranged into the cavity of an annular shaped mould with inner diameter of 335 mm and height of 70 mm, to form a layer.

A fabric of carbon reinforcing fibers of annular shape, prepared in a conventional manner and having 6 fibers per cm, was arranged on the above layer. The reinforcing fibers of this fabric had diameters between 0.3 mm and 0.5 mm and formed bundles of 3000 units or 3K, impregnated with polyurethane.

The above fabric was then coated with more mixture until the mould was filled.

The mixture comprising the fabric was then formed by heating the mould to a temperature of 100° C. and applying a pressure of 30 bar, for producing a rough body shaped as a disc, or "green body".

The rough body was then removed from the mould and baked in a furnace for 12 hours at the temperature of 1100° C. The (pyrolysis) firing took place with an overpressure of 30 mbar in inert atmosphere thanks to an argon flow conveyed in the furnace with a flow rate of 30 liters/min.

After the firing, the disc was subject to a dry finish, for example with diamond tools, in a conventional manner.

At that point, the rough disc was placed inside a container provided with holes for the gas venting. The container was then filled with an amount of silicon in granular form. The container was then heated in the furnace up to a temperature of 1500° C. and left in the furnace for 8 hours. The firing was then conducted partly at a vacuum, at a residual pressure of 2 mbar and was followed by cooling inside the furnace by a continuous nitrogen flow.

The composition of the composite material, expressed as percentages by volume relative to the material volume, was as follows: 55% of filament bundles, 10% of additives, 15% of reinforcing fibers and 20% of products generated by the binder pyrolysis.

The disc thus obtained, after cooling, was subject to finish by diamond tools for removing the deformations from the surface and achieve the shape with the desired precision and tolerance for the subsequent steps that shall be described hereinafter.

* * *

In accordance with a third embodiment, it is envisaged that the carbon fibers to use in making the composite material are previously subject to a pre-treatment comprising the following sub-steps.

The carbon fibers, in the form of filaments, filament bundles or fabrics, are coated with a synthetic resin (for example furanic or phenolic).

The fibers are then compressed together into a mould for ejecting the air present and the resin is solidified maintaining the forming pressure.

The product thus obtained is then subject to carbonization in inert atmosphere up to maximum temperatures of 1250° C., preferably up to 850-950° C. Preferably, the heating speed in the range between 300° C. and 600° C. must be slow, for example equal to 4° C./h.

The carbonized product is then impregnated in a vacuum with an organic compound (for example phenolic, furanic resins and/or pitches) and then subject again to carbonization, in this case at a higher speed. This second impregnation and carbonization has the purpose of forming other carbon layers on the product obtained, closing any pores thereon.

The product thus obtained is then subject to a graphitizing process, in a conventional manner, at temperatures between 1800° C. and 2400° C.

At this point, the product is crumbled using grinding machines, obtaining pieces of graphitized carbon fibers.

The material thus obtained is then mixed with an organic binder (for example, phenolic and/or furanic resins).

The mixture thus obtained is then subject to forming in a mould, at pressures comprised between 10 and 30 bar for a time ranging between 30 min and 5 hours, in order to harden the resins therein.

The shaped body thus obtained is then subject to carbonization in inert atmosphere (pyrolysis) at temperatures comprised between 850° C. and 1250° C.

Advantageously, a graphitizing process is envisaged at temperatures comprised between 1800° C. and 2200° C.

The carbonized body then undergoes a silicon infiltration process at temperatures comprised between 1450° C. and 2200° C., preferably between 1650° C. and 1750° C. Once the temperature required for the silicon infiltration in the porous body and for the SiC formation has been reached, the treatment continues for a time comprised between 10 min and 1 h.

In accordance with a further embodiment, according to any one of the methods described above, parts of a component, for example a braking band, are manufactured and are then assembled to one another for forming a braking band, for example by gluing. In this way it is possible to make with different features surface layers of the braking flanges in the proximity of the braking surfaces relative to the body of the braking band, as well as give a special shape to the ventilation ducts or channels in the case of ventilated braking band.

EXAMPLE 2

Below is an example of preparation of the composite material according to the above third embodiment of the process for making a braking band composite structure of a brake disc according to the invention.

Carbon filament bundles 3K were mixed for about one hour with an aqueous mixture (14% of water) of phenolic resin.

The mixture was subject for 3 h to forming and hardening into a mould at the temperature of 140° C. and at a pressure of 5N/mm2.

The shaped body thus obtained was then subject to pyrolysis up to the final temperature of 900° C. for a period of 144 h.

At the end of the pyrolysis, the product was subject again to two impregnation and pyrolysis cycles for 8 h up to a maximum temperature of 950° C.

The product thus obtained was then subject to a 20 min graphitizing process with heating in inert atmosphere up to 2200° C.

The product thus treated was then crumbled to obtain a fraction equal to 48% of particles having a size between 0.25 mm and 2 mm and a fraction equal to 1% of particles of size larger than 2 mm.

The ground material was then mixed for 15 min with a phenolic resin added with micro-granules of fossil coal on tar pitch (grain size≦20 μpm). The composition in percentages by weight was as follows: 31.9% of phenolic resin, 9.6% of pitch and 58.5% of ground material.

The mixture thus obtained was then subject to forming in a mould, at a pressure of 15 bar and a temperature of 150° C. for 2 h in order to cure the resin therein.

The shaped body thus obtained was then subject to carbonization in inert atmosphere (pyrolysis) up to a maximum temperature of 900° C. for a period of 144 h, and then to graphitizing for 15 min in Argon atmosphere at a temperature of 2200° C.

The carbonized body then undergoes a vacuum silicon infiltration process (3 mbar of absolute pressure) at a temperature of 1750° C.

\* \* \*

As already mentioned hereinbefore, at the end of the silicon infiltration step, the braking band body exhibits at least one surface layer consisting of a composite ceramic structure which comprises SiC (Silicon Carbide) and Si (silicon) phases wherein carbon filament bundles are buried. Such surface layer is coated by a continuous thin film essentially consisting of Silicon and, in some cases, of Silicon Carbide.

According to the production process of the present invention, at the end of the silication step, once cooled, the body of composite ceramic material is subject to a mechanical processing step for obtaining two opposite planar and parallel braking surfaces.

This mechanical processing step only concerns a portion of the body surface and comprises surface finishing operations, in particular of braking surface finish, which can be carried out at a dry or wet in a conventional manner.

Such operations have the primary purpose of removing the above continuous film comprising silicon and of obtaining the planarity of the above braking surfaces and removing any surface deformations present thereon.

Thus, at the end of this mechanical processing step, at the braking surfaces, the thin silicon and silicon carbide film is completely removed, thus exposing the surface layer consisting of the matrix of silicon and silicon carbide with carbon filaments buried therein.

At the braking surfaces the braking band body therefore exhibits carbon fiber filaments exposed on the surface.

The term surface hereinafter refers to the material comprised up to a maximum depth of about 500 μm (0.5 mm).

Figure 4:
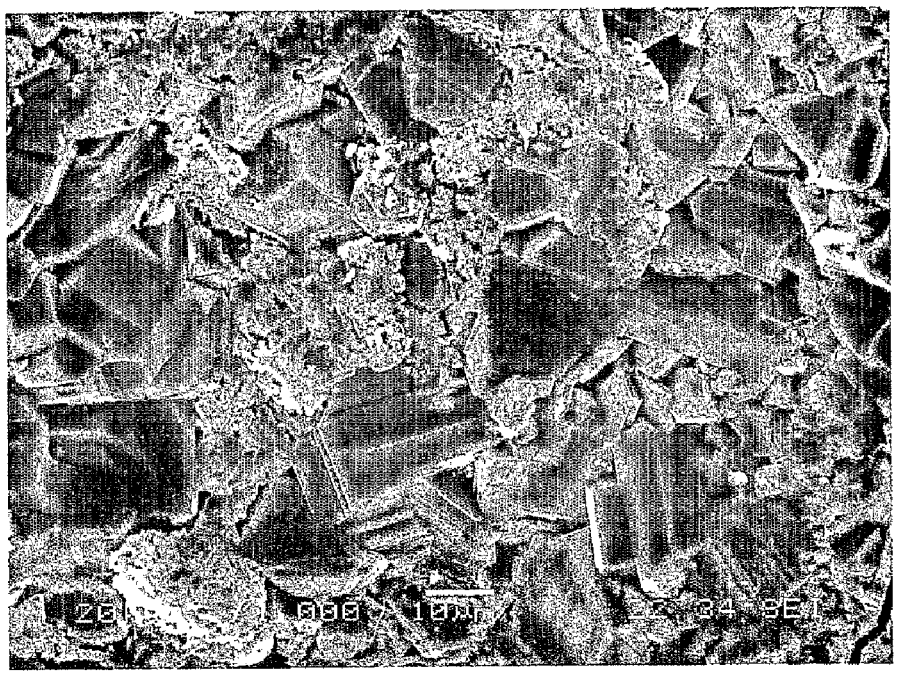
FIG. 4 shows a micro-photography of the surface state of the braking surface of the band body after the silication and the subsequent mechanical process for removing the silicon film, wherein silicon and silicon carbides can be seen.

In the micro-photography shown in the annexed FIG. 4, it is possible to see the surface state of the braking surfaces following the silication and the mechanical finishing process. In particular, in the enlargement of FIG. 4 it is possible to see a portion of braking surface showing the silicon and the silicon carbide phases.

Figure 5:
FIG. 5 shows a micro-photography of the surface state of the braking surface of the band body after the silication and the subsequent mechanical process for removing the silicon film, wherein the carbon fibers of a fiber bundle partly emerging from the surface can be seen.

In the micro-photography shown in the annexed FIG. 5, it is possible to see with greater enlargement the portion of the braking surface with the presence of carbon fibers of a fiber bundle emerging from the surface.

\* \* \*

Advantageously, but not necessarily, after the mechanical processing of the body it is possible to envisage a step of impregnation of the body of composite ceramic material with an anti-oxidant compound to protect also the inside channels and the disc interior from oxidation.

According to a particular embodiment solution, the anti-oxidant substance is a phenolic resin solution dissolved in an organic solvent, preferably furfuryl alcohol.

Advantageously, the solution of phenolic resin in furfuryl alcohol can be added with carbon and/or silicon carbide powder.

\* \* \*

The process according to the invention at this point envisages a step of removal of the surface carbon not bonded with the silicon at the above braking surfaces.

According to a fundamental aspect of the present invention, the surface carbon removal essentially has the purpose of preventing the end product from exhibiting, underneath the anchoring substrate and the protective coating, which are described in greater detail hereinafter, carbon fibers interconnected so as to form preferential oxidation paths parallel to the coating itself.

The presence of such paths would in fact impair the life of the brake disc. The combustion of the carbon fibers along such paths (which would unavoidably trigger due to the high and very high operating temperatures of the braking discs and to the presence of the oxygen penetrated through the protective coating) over time would cause the forming of micro-cavities parallel to the anchoring substrate and to the protective coating, generating the conditions for the propagation of cracks and flaws with the consequent flaking off of the coating itself.

Preferably, the surface carbon removal extends up to a depth comprised between a minimum of 0.1 mm and a maximum of 0.6 mm, and even more preferably between 0.2 mm and 0.5 mm.

It has been noted that a removal of the surface carbon limited to thicknesses below 0.1 mm does not ensure that the remaining carbon filaments are completely disconnected from one another, considering all the possible spatial arrangements of the filaments and the possible diameters thereof.

The upper depth limit of carbon removal on the other hand is dictated by the maximum value that the end protective coating can have. A carbon removal extended to thickness of more than 0.6 mm would lead to have in some points, coating thicknesses exceeding 0.7-1 mm, with the high risk of generation of dangerous tensions and consequently, cracks and flaws.

\* \* \*

According to a preferred embodiment, the surface carbon removal is carried out mechanically, in particular by cleaning the braking surfaces with an abrasive jet.

Preferably, SiC powder (silicon carbide) or corindon powder (Al2O3) are used as abrasive material but it is also possible to use mullite (3Al2O3.2SiO2) powder or glass powder if it is intended to reduce the removal at the Si and SiC phases.

Advantageously, the usable powder has a grain size comprised between 200 and 500 μm of average diameter.

Figure 1:
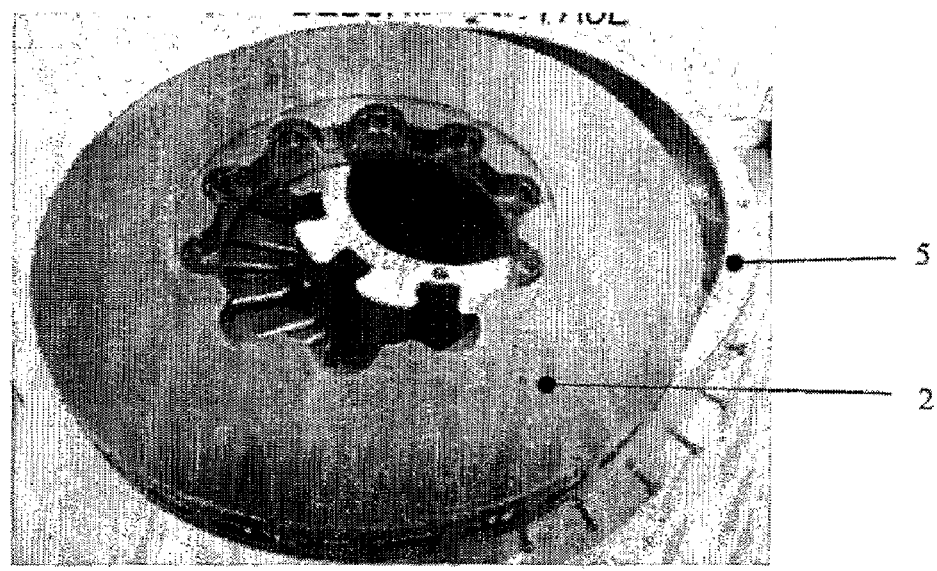
FIG. 1 shows a green body 2 obtained after the hot forming in a mould of a mixture comprising among the other things phenolic resin and carbon filament bundles.
Figure 2:
FIG. 2 shows a braking band body after the pyrolysis (porous carbon-carbon body)
Figure 3:
FIG. 3 shows a braking band body after the infiltration of silicon (silication) in the carbon-carbon body of FIG. 2 obtaining a body mainly made of ceramic material containing SiC, Si, Carbon filament bundles.
Figure 6:
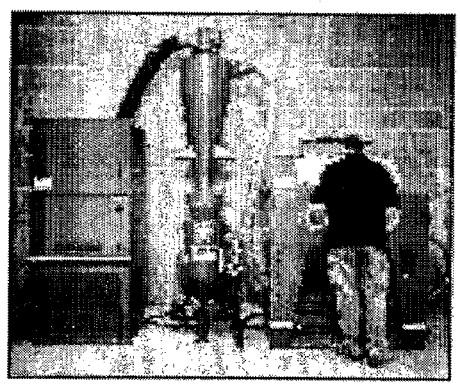
FIG. 6 shows a step of the cleaning process with abrasive jet of the braking surfaces previously mechanically processed removing the silicon coating layer, so as to remove the carbon fibers up to a predetermined depth from the braking surface.

Preferably, the cleaning step is conducted using automated sandblasting systems with nozzle fed with compressed air. An example of system usable is the Blast Cabinet™ mod. ABD 1500 or the device Indirect 60I Pressure System (depicted in the annexed FIG. 6), both products made by the company Airblast™.

The abrasive material in the form of powder is carried by a flow of compressed air and then projected on the part to be treated by a nozzle. The latter has a diameter variable between 8 and 12 mm and is made of a harder material than the abrasive powders used (corindon, mullite, glass, SiO2, SiC), such as Boron Carbide (B4C).

Preferably, a rate of abrasive powder is used which is comprised between 0.6 and 2 liters of powder/min and an air rate of about 5 m3/min.

Preferably, the abrasive jets have a pressure variable within the range between 1 and 5 bar.

Advantageously, these automatic sandblasting systems are provided with a closed operating chamber inside which there is arranged at least one moving nozzle and a turntable on which the part to be treated is placed.

In order to obtain a cleaning treatment as even as possible, the piece to be treated is made to rotate at a speed comprised between 5 and 10 rpm by the turntable, whereas the nozzle is moved in radial direction relative to the part at a speed comprised between 1 and 4 mm/s, preferably 2 mm/s.

Preferably, the nozzle is kept at a distance comprised between 180 mm and 220 mm from the surface of the part to bet treated, and preferably 200 mm.

The length of the cleaning treatment depends on the carbon removal depth to be obtained. In the above operating conditions, using SiC powder having a grain size of about 500 μm, the cleaning treatment time changes from a minimum of 10 min to obtain a removal up to 100 μm to a maximum of 30 min to obtain a removal up to 600 μm.

Advantageously, at the end of the cleaning step with abrasive jets, the residual powder is blown away from the part with air jets.

* * *

In accordance with another embodiment, the surface carbon application can be carried out by combustion.

Preferably, the surface carbon combustion is carried out by burning in the furnace in controlled atmosphere.

In particular, the burning in furnace is carried out with a mean percentage by volume of oxygen (O2) comprised between 18% and 20%, and preferably equal to 19%.

Advantageously, the burning is carried out at a temperature comprised within the range between 550° C. and 1400° C., and preferably within the range between 600° C. and 1.000° C.

In particular, the burning process time is comprised between 30 min and 4 hours and is preferably equal to 2 hours.

Operatively, the disc of composite ceramic material is heated in the presence of oxygen at temperatures above 550° C., temperature at which the carbon combustion reactions trigger. The temperatures must not exceed 1430° C., temperature at which the silicon melting begins, with consequent disc collapsing.

The combustion depth level essentially depends on the process length, on the temperature and on the oxygen percentage in the comburent air.

Preferably, the temperature is kept below 1000° C. for limiting the carbon burning to the braking surfaces only and preventing the onset of undesired silicon oxidation phenomena.

In this way, also the carbon present in the portions not belonging to the braking surfaces and protected from the combustion and they are therefore protected by the thin Si and SiC film, not removed during the previous mechanical processing step.

Advantageously, the parts can be heated up to 650° C. in a controlled atmosphere with a medium percentage of oxygen (O2) equal to 19%, keeping the parts at such temperature for about 2 hours. The heating ramp and the treatment time depend on the amount of parts loaded into the furnace.

At the braking surfaces without the thin Si and SiC film, the carbon combustion proceeds progressively from the part surface inwards, essentially regulated by the diffusive oxygen phenomena inside the air spaces and the porosities present in the Si and SiC matrix. This phenomenon contributes to preserving also the innermost carbon structure of the part at the braking surfaces from the degradation.

* * *

As an alternative, the surface carbon combustion can be carried out by flashing, using a direct flame, for example of the welder lamp type. In this case, the zone concerned by the combustion is that exposed to the flame, i.e. the braking surfaces.

* * *

At the end of the surface carbon removal step, the body of the braking band exhibits a core consisting of a Si, SiC and carbon matrix (essentially in the form of fibers) and, only as regards the previously processed portions (braking surfaces), a surface layer consisting of Si and SiC, which exhibits micro-cavities and craters due to the removal of the surface carbon.

These micro-cavities have a maximum depth equal to the thickness of the layer concerned by the carbon removal (<0.6 mm) and a surface extension related to the arrangement of the burnt or removed carbon fibers.

Figure 8:
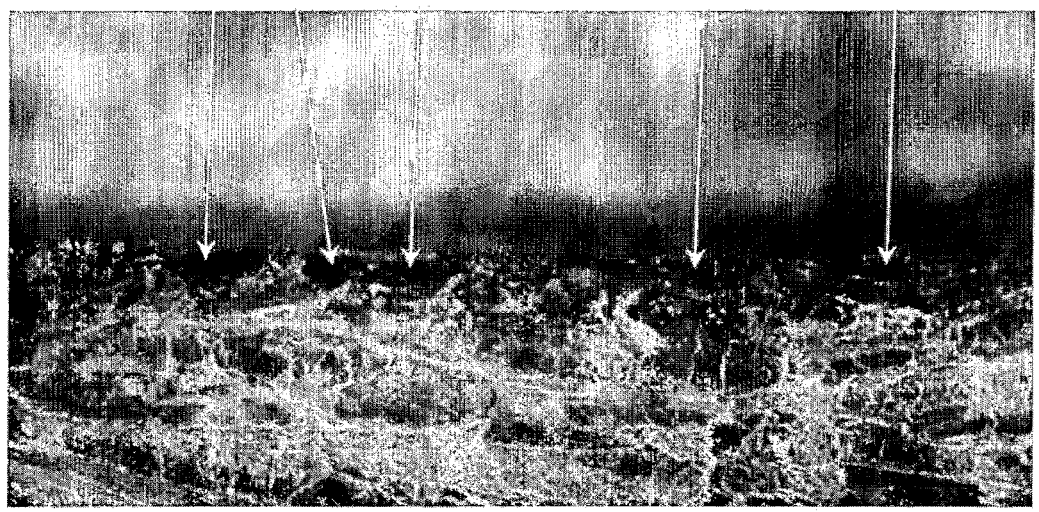
FIG. 8 shows a micro-photography of a section of a braking band composite body following the cleaning step with abrasive jet.
Figure 9:
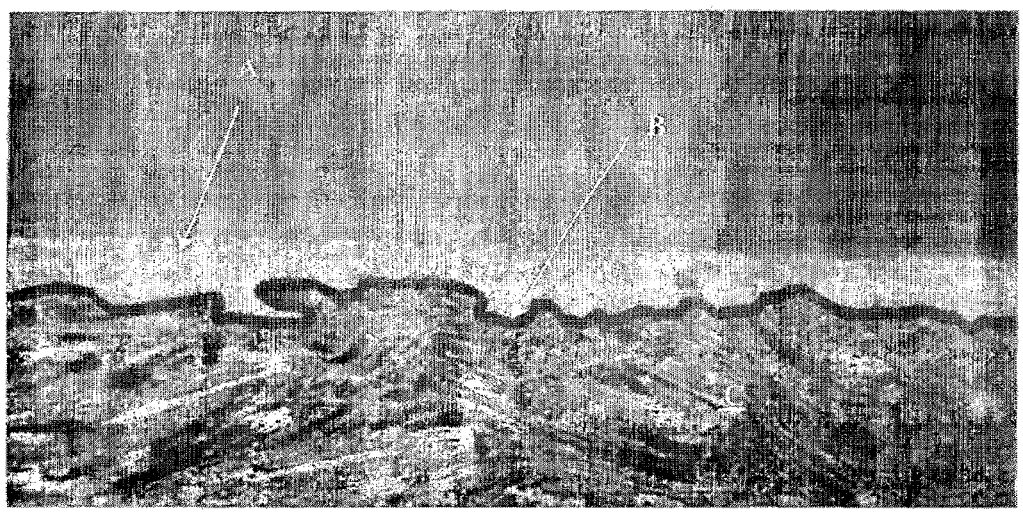
FIG. 9 shows a micro-photography of a cross section of a braking band composite body after the deposition of an anchoring substrate (indicated with arrow B) and of a protective layer (indicated with arrow A) but before the surface finish processing.

In the micro-photography shown in the annexed FIG. 8 which shows a section of a composite body of braking band after the cleaning step with abrasive jet, it is possible to see the presence of micro-craters (pointed out with the arrows in the Figure).

* * *

According to a preferred solution of the invention, after the step of removal of the surface carbon there are provided in a sequence the step of deposition of an anchoring substrate at the braking surfaces from which the carbon not bonded with the silicon has been previously selectively removed and the step of deposition of a protective coating on said substrate.

* * *

The anchoring substrate allows the adhesion of the protective coating to the composite ceramic structure, while uncoupling from a mechanical standpoint the protective coating from the underlying composite ceramic structure.

As already mentioned, the step of deposition of the anchoring substrate is carried out after the step of removing the carbon not bonded with the silicon.

Advantageously, the anchoring layer only partly fills the microcavities due to the removal of the carbon not bonded with the silicon. Preferably, the anchoring layer partly fills the above micro-cavities strictly following the profile thereof so as to form a continuous.

In this way, even after the step of deposition of the anchoring substrate, the braking surfaces still exhibit such micro-roughness as to allow the gripping of the protective coating to the underlying composite ceramic structure.

Preferably, the anchoring substrate is made of metal material.

Advantageously, the metal material can comprise Nickel (Ni), Aluminium (Al), Chromium (Cr) and Copper (Cu), taken individually or as an alloy.

According to a preferred embodiment solution, the metal substrate comprises Aluminium (Al) with a percentage by weight comprised between 1 and 30%, the balance being Nickel (Ni).

Particularly preferred is the solution that provides an anchoring substrate made of Nickel by 95% by weight and Aluminium (Al) by the 5% balance.

According to other embodiment solutions, the anchoring substrate can contain, besides Nickel and Aluminium (Al), also Copper (Cu) and, in addition or in alternative, also Chromium (Cr).

Advantageously, Chromium and Copper can each be present in the anchoring layer up to a percentage by weight equal to about 10%.

Preferably, the anchoring substrate has a thickness comprised in the range between 30 μm and 200 μm.

Even more preferably, the anchoring substrate has a thickness comprised in the range between 50 μm and 100 μm.

Thickness below 30 μm do not ensure the uncoupling between the protective coating and the underlying composite ceramic structure; thickness above 200 μm can generate tensions for different thermal expansion.

Preferably, the anchoring substrate is deposited by plasma deposition.

Advantageously, the substrate plasma deposition is carried out in controlled atmosphere (for example using the Controlled Atmosphere Plasma Spray technique) for preventing the oxidation of the powders (in particular if metallic) used to make the substrate.

* * *

In accordance with a preferred embodiment, also the protective coating is deposited by plasma deposition.

* * *

A plasma deposition process essentially consists in spraying a fused or partly fused material on a surface of an item to be coated.

Figure 7:
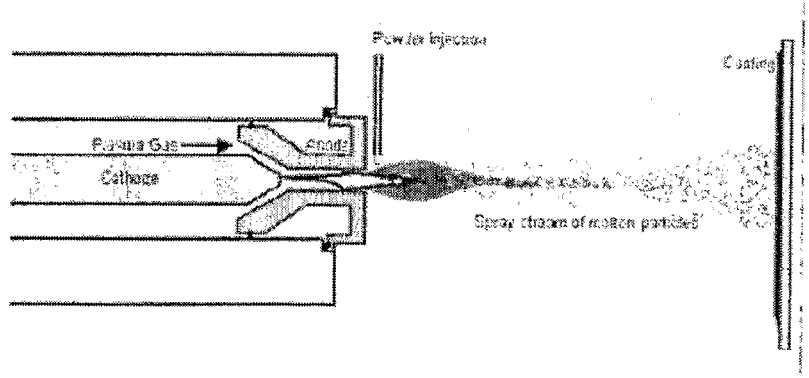
FIG. 7 schematically shows the steps of plasma deposition of an anchoring substrate and of plasma deposition of a protective layer on the braking surfaces whereon the carbon has been previously removed by a predetermined depth.

As schematized in the annexed FIG. 7, the material in the form of powders in injected in a plasma jet at a very high temperature (which can reach 30,000° C.). The powders are accelerated at high speed by the jet flow and heated to their melting point by heat transfer from the plasma. The powders are directed on the item surface and after the impact, they generate a coating of many layers of superimposed particles.

This deposition process is called cold process since normally, the substrate is not heated above 150° C., with the advantage of not altering the mechanical properties thereof.

Advantageously, in any case, it is possible to keep the substrate temperature lower by air or liquid gas cooling systems.

Preferably, a device with non-transferred arc plasma torch is used for the deposition of both the anchoring substrate and the protective coating.

The torch is provided with a copper anode and a tungsten cathode. A transport gas is made to flow around the cathode which then flows through the nozzle shaped anode. The transport gas can consist of argon, nitrogen, helium or mixtures thereof with hydrogen.

The plasma is activated by a direct current electrical arc between the electrodes, usually preceded by a high frequency discharge. Voltage and current vary with the cathode/anode geometry and based on the gas flow and composition. The plasma generated through the electrical arc consists of free electrons, ionized atoms and neutral atoms. The anode/cathode configuration, the gas density, the flow speed and the electrical power determine the plasma temperature and speed.

The plasma jet speed for conventional torches is subsonic, but supersonic speeds can be generated using diverging/converging nozzles with critical output angles.

Preferably, the powders of the material to be sprayed are charged in the plasma jet through a feeding duct directly at the nozzle output (anode).

Preferably, the grain size of the powders that can be used in the plasma deposition ranges between 5 and 60 μm. Even more preferably, for the anchoring layer deposition the powder grain size varies from 20 to 45 μm.

To achieve even acceleration and heating of the single powder component it is necessary to have a minimal grain size distribution. Very fine powders are heated and accelerated more quickly, but at the same time they tend to lose momentum faster when they are sprayed at larger distances. Finer powders also tend to cause operating problems to the torch. Even if the use of larger grain size powders implies additional costs, it gives greater deposition efficiency and better deposition product quality.

Preferably, pure Al2O3 powders or Al2O3 mixed with TiO2 are used for the protective coating, preferably with percentage ratios by weight equal to 97/3, 87/13 and 60/40.

According to a preferred alternative solution, pure Cr2O3 powder is used for the protective coating.

According to two more particular embodiment solutions, a mixture with 50% by weight of Cr2O3 and 50% of Al2O3/TiO2 and a mixture with 50% by weight of Hastelloy C and 50% of Al2O3/TiO2 is used for the protective coating.

However, it is advantageously possible to use also powders of metals or non-metals, preferably Ti or Si, both pure and mixed.

Preferably, a mixture of Ni (nickel) and Al (aluminum) powders is used for the anchoring layer with percentage ratios by weight that can range from 70/30 to 99/1. Such mixtures can also be added with Cr (chromium) and/or Cu (copper) powders, with percentages by weight for each of these two elements up to 10%.

Particularly preferred is the solution that provides the use of a mixture of powders of Nickel by 95% by weight and aluminum (Al) by the 5% balance.

A particularly advantageous solution provides for the anchoring substrate to be made with Ni 95%/Al 5%, while the protective coating is made with pure Al2O3 or a mixture of Al2O3/TiO2 according to the already mentioned preferred ratios by weight.

If the materials used for making the protective layer already are at the oxidized state, such as Al2O3 and TiO2, the deposition can take place in the presence of oxygen, or in standard ambient (or atmospheric) conditions, using the so-called Atmospheric Plasma Spray (APS) technique.

If metals at the non-oxidized state are used like Ni, Al, Cr, Cu or Ti, to prevent the onset of undesired oxidation reactions which would alter the chemical-physical characteristics of the (protective or anchoring) coating, the deposition must take place without or at least with reduced presence of oxygen.

In this case, the plasma deposition is carried out in a vacuum, using the so-called Vacuum Plasma Spray (VPS) technique, or in partial vacuum (LVPS=Low Vacuum Plasma Spray), or in controlled atmosphere of inert gas (CAPS=Controlled Atmosphere Plasma Spray).

In general, with the plasma deposition technique it is possible to obtain thickness of the anchoring substrate and of the protective coating comprised within the range of 0.05-0.5 mm.

Operatively, the spray plasma systems used are provided with a closed operating chamber inside which at least one spraying nozzle acts and there is arranged a turnable platform on which at least one part to be treated is placed.

In order to obtain a spraying as even as possible, the piece to be treated is made to rotate at a speed comprised between 5 and 10 rpm, whereas the nozzle moves in radial direction relative to the piece at a mean speed comprised between 1 and 4 mm/s, and preferably about 2 mm/s.

Advantageously, the nozzle passes onto the same surface portion several times.

Preferably, the radial speed is controlled so that it increases passing from the periphery to the centre so as to obtain even deposition thickness.

* * *

For example, it is possible to use a Plasma Spray PM 9 MB equipment made by Sulzer Metco with single cathode and nozzle at 60°. The machine absorbs an electrical power of 60 kW and can process a rate of 30 rpm of powders with grain size of 10 µm. The carrier gas used is a mixture of He and Ar.

The coating thickness depends on the treatment length and on the rate of material fed by the plasma torch.

Preferably, the deposition time for the plasma deposition of the anchoring substrate can vary between 3 and 5 min. The value of the powder rate is in the range of 30 rpm.

Preferably, the deposition time for the plasma deposition of the protective coating can vary between 20 and 35 min. The value of the powder rate is in the range of 30 rpm.

Preferably, at the end of the deposition step, at the braking bands, the braking band body exhibits a protective coating of mean thickness comprised between 0.2 mm and 0.7 mm and even more preferably between 0.2 mm and 0.5 mm.

* * *

As an alternative, the protective coating can also be deposited by a Flame Spray, HVOF (High Velocity Oxygen Fuel Thermal Spray Process), Arc Spray or Detonation Thermal Spray Process. All these processes envisage the combustion of the spraying carrier and therefore exhibit the limit of causing the oxidation of the materials forming the coating.

Such techniques therefore are not suitable for the anchoring substrate deposition when it is made according to the preferred solution that provides the use of metal powders at the non-oxidized state.

* * *

Preferably, after the step of deposition of the protective coating, a step of mechanical finishing of the above braking surfaces is envisaged.

Such mechanical process is intended for grinding the braking surfaces for obtaining the desired roughness, planarity and thickness. Diamond tools are used for this purpose.

In particular, this mechanical finishing step allows reducing the thickness of the protective layer, bringing it to thicknesses below 0.5 mm, and preferably between 0.1 and 0.3 mm, and even more preferably to 0.2 mm.

Preferably, the mechanical finishing step is carried out to bring said protective coating to have a roughness RA comprised within the range between 1 µm and 3 µm.

Advantageously, the mechanical finishing step is carried out for imparting a predetermined planarity degree to said braking surfaces.

Advantageously, the mechanical finishing step is carried out for imparting a predetermined parallelism degree to said braking surfaces.

* * *

At this point, the braking band body is ready to be assembled for example to a traction bell, obtaining a product of the type depicted in FIG. 10.

Advantageously, the process according to the invention can provide the step of assembling multiple portions of said composite structure for making a braking band of a disc. In particular, the assembly of such portions can be carried out by gluing.

* * *

Some embodiment examples the application of the production process according to the invention shall now be described. Examples 3 and 4 are respectively referred to the composite ceramic structures made according to the description of examples 1 and 2 above.

In all the following examples, it is assumed that the ceramic structure has already been subject to a mechanical process aimed at obtaining braking surfaces without the Si and SiC protective film; therefore, on the surface thereof such surfaces exhibit the Si phase, the SiC phase and the carbon phase of the fibres buried or partly buried in Si and SiC.

EXAMPLE 3

A disc of composite ceramic material obtained according to the description of the previous example 1 was used. Following the finishing process, the silicon and silicon carbide film was removed from the braking surfaces.

The body was subject to cleaning with an abrasive jet, using a sandblasting system mod. ABD 1550 by the company Airblast.

SiC powder with a grain size equal to 500 µm was used as abrasive material. The jet had a rate of about 1 litre of powder/min and a pressure of about 2 bar.

The disc was made to rotate at a speed of about 6 rpm by the turntable, while the nozzle was moved in radial direction relative to the part at a speed of about 2 mm/s, keeping the nozzle at a distance of about 200 mm.

At the end of the cleaning, which lasted for about 25 sec, a surface carbon removal to a variable depth from about 0.3 mm to 0.5 mm was obtained.

After blowing away the residual powder with air jets, the disc was then subject to the step of deposition of the anchoring substrate by plasma technique.

A plasma spray equipment PM 9 MB by Sulzer Metco with single cathode with boron carbide nozzle in the version for working at controlled atmosphere, was used. The equipment was charged with mixed powder of Nickel and Aluminium (percentage ratio by weight equal to 95/5 and grain size equal to 20 µm), with a powder rate of about 30 rpm. The plasma was generated with a mixture of Ar and He.

The disc was made to rotate at a speed of about 6 rpm, with the nozzle moving was moved in radial direction relative to the part at a mean speed of about 2 mm/s, increasing from the periphery towards the centre.

The treatment lasted for about 3 min obtaining an anchoring substrate having a mean thickness of about 60 μm.

The disc was then subject to the step of deposition of the protective coating, using the plasma spray technique.

The same equipment used for depositing the anchoring substrate was used. The equipment was charged with mixed powder of Al2O3 and TiO2 (percentage ratio by weight equal to 96/4 and grain size equal to 10 μm), with a powder rate of about 30 rpm. The plasma was generated with a mixture of Ar and He.

The disc was made to rotate at a speed of about 6 rpm, with the nozzle moving was moved in radial direction relative to the part at a mean speed of about 2 mm/s, increasing from the periphery towards the centre.

The treatment lasted for about 35 min obtaining a protective coating having a mean thickness variable from 500 to 600 μm.

After cooling, the disc was subject to a final finishing process with diamond tools.

A disc has thus been obtained that at the braking surfaces exhibits an anchoring substrate of Ni 95/Al 5 having a mean thickness of about 60 μm and a protective coating of Al2O3 96/TiO2 4 having a mean thickness of about 400 μm.

EXAMPLE 3 bis

The operations carried out were as in the previous example 3, with the exception that pure Al2O3 with mean grain size of 10 μm was used to make the protective coating.

A disc has thus been obtained that at the braking surfaces exhibits an anchoring substrate of Ni 95/Al 5 having a mean thickness of about 60 μm and a protective coating of Al2O3 having a mean thickness of about 400 μm.

EXAMPLE 3 tris

The operations carried out were as in the previous example 3, with the exception that pure Cr2O3 with mean grain size of 10 μm was used to make the protective coating.

A disc has thus been obtained that at the braking surfaces exhibits an anchoring substrate of Ni 95/Al 5 having a mean thickness of about 60 μm and a protective coating of Cr2O3 having a mean thickness of about 400 μm.

EXAMPLE 4

A disc of composite ceramic material obtained according to the description of the previous example 2 was used. Following the finishing process, the silicon and silicon carbide film was removed from the braking surfaces.

The body was subject to cleaning with an abrasive jet, using a sandblasting system mod. ABD 1550 by the company Airblast.

SiC powder with a grain size equal to 300 μm was used as abrasive material. The jet had a rate of about 0.8 litres of powder/min and a pressure of about 2 bar.

The disc was made to rotate at a speed of about 7 rpm by the turntable, while the nozzle was moved in radial direction relative to the part at a speed of about 1,8 mm/s, keeping the nozzle at a distance of about 200 mm.

At the end of the cleaning, which lasted for about 30 sec, a surface carbon removal to a depth of about 0,4 mm was obtained.

After blowing away the residual powder with air jets, the disc was then subject to the step of deposition of the anchoring substrate by plasma technique.

A plasma spray equipment PM 9 MB by Sulzer Metco with single cathode with boron carbide nozzle in the version for working at controlled atmosphere, was used. The equipment was charged with mixed powder of Nickel (Ni), Aluminium (Al) and Chromium (Cr) (percentage ratio by weight Ni/Al/Cr equal to 70/23/7 and grain size equal to 20 μm), with a powder rate of about 30 rpm. The plasma was generated with a mixture of Ar and He.

The disc was made to rotate at a speed of about 6 rpm, with the nozzle moving was moved in radial direction relative to the part at a mean speed of about 2 mm/s, increasing from the periphery towards the centre.

The treatment lasted for about 4 min obtaining an anchoring substrate having a mean thickness of about 80 μm.

The disc was then subject to the step of deposition of the protective coating, using the plasma spray technique.

The same equipment used for depositing the anchoring substrate was used. The equipment was charged with mixed powder of Al2O3 and TiO2 (percentage ratio by weight equal to 97/3 and grain size equal to 15 μm), with a powder rate of about 30 rpm. The plasma was generated with a mixture of Ar and He.

The disc was made to rotate at a speed of about 6 rpm, with the nozzle moving was moved in radial direction relative to the part at a mean speed of about 2 mm/s, increasing from the periphery towards the centre.

The treatment lasted for about 30 min obtaining a protective coating having a mean thickness of about 500 μm.

After cooling, the disc was subject to a final finishing process with diamond tools.

A disc has thus been obtained that at the braking surfaces exhibits an anchoring substrate of Ni 70/Al 23/Cr 7 having a mean thickness of about 80 μm and a protective coating of Al2O3 97/TiO2 7 having a mean thickness of about 350 μm.

EXAMPLE 4 bis

The operations carried out were as in the previous example 4, with the exception that pure Al2O3 with mean grain size of 15 μm was used to make the protective coating.

A disc has thus been obtained that at the braking surfaces exhibits an anchoring substrate of Ni 70/Al 23/Cr 7 having a mean thickness of about 80 μm and a protective coating of Al2O3 having a mean thickness of about 350 μm.

EXAMPLE 5

A mixture containing (percentages by volume referred to the mixture volume) 50% of carbon fibres, having diameters comprised between 0.1 mm and 0.5 mm and mean length of 8 mm, 45% of dry phenolic resin, and 5% of graphite powder was prepared with an Eirich mixer.

The mixing lasted 5 minutes.

An annular shaped mould with inner diameter of 335 mm and height of 70 mm was filled to form a layer.

The mixture was then formed by heating the mould to a temperature of 160° C. and keeping it at such temperature for about 40 min. A pressure of 30 bar was applied, obtaining a rough body shaped as a disc.

The rough body was then removed from the mould and baked in a furnace for 48 hours at the temperature of 950° C. The firing took place with an overpressure comprised between 2 and 30 mbar in inert atmosphere thanks to an argon flow conveyed in the furnace with a flow rate of 30 litres/min.

At that point, the rough disc was placed inside a graphite crucible adding an amount of 99% pure silicon equal to 1.35 times the disc weight.

The crucible was then placed in the furnace and here heated to 1600° C. and kept at such temperature for about 0.5 hours. The firing was carried out in a vacuum with residual pressure of 2 mbar.

The disc thus obtained, after cooling, was subject to a mechanical grinding process with diamond wheels for obtaining planar braking surfaces.

The disc was then impregnated with anti-oxidant in a vacuum and made to dry in the furnace with inert atmosphere (Ar) at 600° C.

The body was then subject to cleaning with an abrasive jet, using a sandblasting system mod. ABD 1550 by the company Airblast.

SiC powder with a grain size equal to 500 µm was used as abrasive material. The jet had a rate of about 0.6 litres of powder/min and a pressure of about 2 bar.

The disc was made to rotate at a speed of about 6 rpm by the turntable, while the nozzle was moved in radial direction relative to the part at a speed of about 2 mm/s, keeping the nozzle at a distance of about 200 mm.

At the end of the cleaning, which lasted for about 15 sec, a surface carbon removal to a depth of about 0.2 mm was obtained.

After blowing away the residual powder with air jets, the disc was then subject to the step of deposition of the anchoring substrate by plasma technique.

A plasma spray equipment PM 9 MB by Sulzer Metco with single cathode with boron carbide nozzle in the version for working at controlled atmosphere, was used. The equipment was charged with mixed powder of Nickel (Ni), Aluminium (Al) and Copper (Cu) (percentage ratio by weight Ni/Al/Cu equal to 75/20/5 and grain size equal to 20 µm), with a powder rate of about 30 rpm. The plasma was generated with a mixture of Ar and He.

The disc was made to rotate at a speed of about 6 rpm, with the nozzle moving was moved in radial direction relative to the part at a mean speed of about 2 mm/s, increasing from the periphery towards the centre.

The treatment lasted for about 5 min obtaining an anchoring substrate having a mean thickness of about 95 µm.

The disc was then subject to the step of deposition of the protective coating, using the plasma spray technique.

The same equipment used for depositing the anchoring substrate was used. The equipment was charged with mixed powder of Al2O3 and TiO2 (percentage ratio by weight equal to 97/3 and grain size equal to 45 µm), with a powder rate of about 30 rpm. The plasma was generated with a mixture of Ar and He.

The disc was made to rotate at a speed of about 6 rpm, with the nozzle moving was moved in radial direction relative to the part at a mean speed of about 2 mm/s, increasing from the periphery towards the centre.

The treatment lasted for about 30 min obtaining a protective coating having a mean thickness of about 400 µm.

After cooling, the disc was subject to a final finishing process with diamond tools.

A disc has thus been obtained that at the braking surfaces exhibits an anchoring substrate of Ni 75/Al 20/Cu 5 having a mean thickness of about 95 µm and a protective coating of Al2O3 97/TiO2 3 having a mean thickness of about 300 µm.

EXAMPLE 5 bis

The operations carried out were as in the previous example 5, with the exception that pure Al2O3 with mean grain size of 45 µm was used to make the protective coating.

A disc has thus been obtained that at the braking surfaces exhibits an anchoring substrate of Ni 75/Al 20/Cu 5 having a mean thickness of about 95 µm and a protective coating of Al2O3 having a mean thickness of about 300 µm.

* * *

It has been experimentally proven that brake discs having braking bands in accordance with the method according to the invention exhibit higher resistance to oxidation and therefore longer life as compared to the brake discs of conventional type.

To this end, an oxidation test was carried out which consisted in subjecting three discs of the same type to two firing cycles in air at 700° C. for 2 hours. At the end of each cycle, the weight loss (in percentage as compared to the initial weight, as an average of the three discs) ascribable to the loss of free carbon, was measured.

The following discs were subject to the test:
three discs without coating (A) obtained according to the process of example 1; and
three discs obtained according to the present invention (D), as described in example 5.

The results are shown in the following Table:

| Disc type | Weight loss (%) | |
| --- | --- | --- |
| | 1st cycle | 2nd cycle |
| A | 0.42 | 0.95 |
| D | 0.3 | 0.20 | from which it is possible to notice a clear reduced weight loss of the disc produced according to the invention.

It has been experimentally proven that brake discs produced in accordance with the process according to the invention exhibit higher braking friction coefficient as compared to the conventional discs.

To this end, a disc (E) produced according to the invention (example 5) and a disc (F) without coating (example 1) were subject to tests to the dynamic bench.

The tests consisted in subjecting the discs to braking from a speed of 260 km/h to a speed of 30 km/h. On an average, the friction coefficient measured for disc E was about 15% higher than the mean one measured for disc F.

Figure 34:
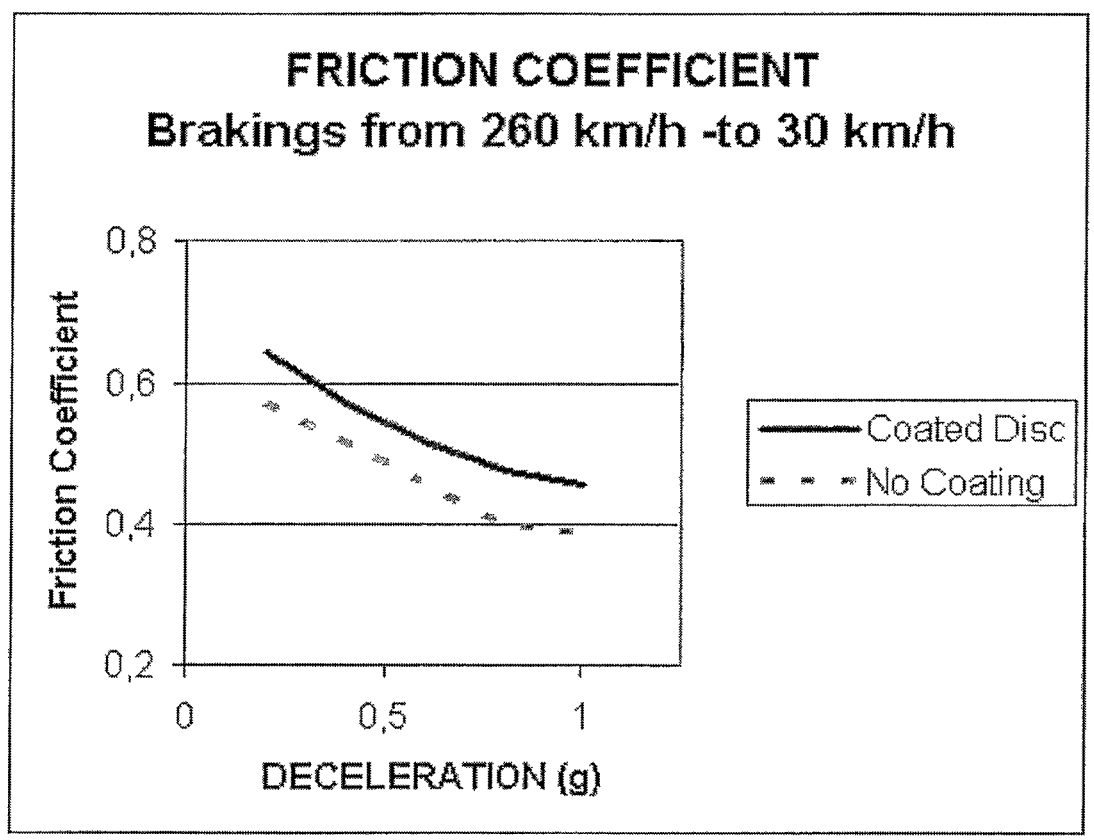
FIG. 34 schematically shows the pattern of the friction coefficient with the deceleration of a disc obtained according to the process proposed herein compared with a ceramic disc of the prior art.

The results are shown in the diagram of FIG. 34, where "Coated Disc" refers to disc E according to the invention, whereas "No Coating" refers to disc F.

Finally, a thermal shock test was carried out on a disc obtained according to the invention (example 5), hardening a disc brought to the temperature of 800° C. by immersion in water at 20° C. for two minutes. The analysis carried out showed no cracks on the surface protective layer.

The composite ceramic materials described above are used in several applications where a high resistance to impact, compression and temperature generated by friction is required, characteristics that cannot be ensured by simple ceramic materials due to the intrinsic fragility thereof. An interesting embodiment, as said above, is that in braking systems, in particular for preparing discs for disc brakes.

The composite material can be shaped in various shapes according to the end use thereof. In particular, the material can be advantageously used in the production of brake components for vehicles, in particular of disc brakes.

In such embodiment, the above material can be shaped as a braking band or ring for disc for making the braking component of a disc brake or being applied to a traction bell of such braking band. Moreover, the above material can also be applied to the calliper body of a disc brake, as well as to the braking pad and be shaped in a suitable manner for such applications. With the composite material it will also be possible to make so-called ventilated discs, such as those described in international applications no. PCT/IT00/00543 of Dec. 22, 2000, no. PCT/IT01/00412 of Jul. 27, 2001 and no. PCT/IT01/00411 of Jul. 27, 2001 in the name of the same Applicant of the present patent application.

Below are some of the major advantages of the present invention.

In the proposed material, the carbon phase arranged in a single plane below the thin protective coating is not present, thus preventing many little burns from being aligned for forming a crack propagation path that separates this protective coating from the underlying body matrix. In other words, the forming of an interconnected path for the propagation of flaws or cracks is prevented.

Advantageously, thanks to the proposed solution, it is possible to envisage a protective coating with predetermined thin thickness as desired.

In this way, moreover, the protective layer is prevented from tensioning on the surface.

Even more advantageously, the presence of the anchoring substrate arranged between the protective coating and the composite ceramic structure allows on the one side to have a geometric coupling between the two portions uncoupling them from a mechanical standpoint, thus reducing the risk of tensioning.

In particular, thanks to the proposed solution, the anchoring substrate is deposited in the micro-cavities (rough parts) left free from carbon after cleaning with abrasive jet or burning or flashing. The substrate does not completely fill such micro-cavities but creates a continuum strictly following the profile thereof. The protective coating deposited thereon can continue to use the grip offered by the rough part of thet underlying surface, strictly and geometrically coupling with the body.

In any case, the carbon still present in the body and not removed is inside the body and not aligned in an interconnected path of propagation of the crack which when forms always meets a barrier of Si and/or SiC and/or reinforcing fibres which stops the progress thereof.

Thanks to the fact that the protective layer does not flake off and does not detach from the braking surface, this remains smooth, planar and parallel, allowing excellent running comfort and extending the disc life.

A man skilled in the art may make several changes, adjustments and replacements of elements with other functionally equivalent ones to the preferred embodiment solution of the material and of the braking band described above, in order to meet specific and incidental needs, without departing from the scope of the following claims.

* * *

The object of the present invention is a apparatus for making a composite structure or a portion of structure of a braking band.

More in detail, such apparatus comprises:
at least one station for making a composite ceramic structure, comprising carbon fibre filaments, silicon and silicon carbides, obtaining a body of a braking band (3) comprising at least one braking surface (4);
at least one station for processing the braking surface removing a surface layer so as to have carbon not bonded with the silicon on the surface;
at least one station for mainly selectively removing at least partly the carbon not bonded with the silicon from the surface (up to a predetermined depth);
at least one station for depositing an anchoring layer on the braking surface; and
at least one station for depositing a protective coating on the braking surface on the anchoring substrate.

Advantageously, the station for making a composite ceramic structure in turn comprises the following sub-stations:
at least one sub-station for preparing at least one mixture comprising carbon fibre filaments and an organic binder;
at least one sub-station for forming said mixture in a mould and obtaining a shaped body;
at least one sub-station for pyrolysing the shaped body so as to obtain a porous carbon structure;
at least one sub-station for infiltrating the carbon structure with silicon and obtaining the composite ceramic structure substantially based on carbon, silicon and silicon carbides.

Advantageously, the apparatus further comprises at least one mechanical finishing station of the composite structure. This station is intended for treating the composite structure before the above station for processing the braking surface.

Advantageously, the apparatus further comprises at least one station for drilling the braking band.

Advantageously, the apparatus further comprises a station for assembling the braking band to a traction bell.

Preferably the stations of deposition of the substrate and of the coating are provided with plasma deposition machines.

Preferably, these two stations are separate for allowing a continuous automated processing of the discs, but they can optionally be combined together in a single station.

Preferably, the deposition station of the anchoring substrate allows depositing a substrate of metal or alloy of metals.

Preferably, the deposition station of the coating allows depositing a coating made of oxides.

The invention claimed is:

1. A method for making a composite structure or a portion of a composite structure of a braking band of a brake disc comprising at least the following steps:
making a composite ceramic structure, comprising silicon, silicon carbides and carbon not bonded to silicon, obtaining a body of a braking band comprising at least one braking surface, said carbon not bonded to silicon being present substantially in the form of carbon fibre filaments;
processing said braking surface removing a surface layer so as to have said carbon not bonded with silicon on the surface;
removing at least partly and mainly selectively the carbon not bonded with silicon from the surface, leaving silicon and silicon carbides; and
depositing a protective coating on said surface from which at least partly and mainly selectively the carbon not bonded with the silicon has been removed.

2. A method according to claim 1, wherein at the end of said step of removing at least partly the carbon not bonded with silicon, said composite structure exhibits a surface layer at said braking surfaces, consisting of silicon and silicon carbide, which exhibits micro-cavities due to the removal of the carbon not bonded with silicon, the carbon not bonded with silicon present in said composite ceramic structure thus being away from said braking surface.

3. A method according to claim 2, wherein said surface layer has a thickness comprised between 100 µm and 600 µm.

4. A method according to claim 1, wherein during said removal step, the carbon not bonded with silicon is removed up to a depth comprised within the range between 0.1 mm and 0.6 mm and preferably within the range between 0.2 mm and 0.5 mm.

5. A method according to claim 1, wherein said step of removing the carbon not bonded with silicon is carried out by cleaning said braking surfaces with abrasive jet.

6. A method according to claim 1, wherein said step of removing the carbon not bonded with silicon is carried out by combustion of said braking surfaces.

7. A method according to claim 1, comprising a step of depositing an anchoring substrate directly on said braking surface from which the carbon not bonded with silicon has been at least partly and mainly selectively removed, said protective coating being deposited on said anchoring substrate.

8. A method according to claim 7, wherein said anchoring substrate is of metal material.

9. A method according to claim 8, wherein said metal material comprises one or more metals selected from the group comprising Nickel, Aluminium, Chromium and Copper.

10. A method according to claim 7, wherein said anchoring substrate has a thickness comprised within the range between 30 and 200 µm, and preferably within the range between 50 and 100 µm.

11. A method according to claim 7, wherein said anchoring substrate only partly fills said micro-cavities due to the removal of the carbon not bonded with silicon.

12. A method according to claim 7, wherein said anchoring substrate only partly fills said micro-cavities due to the removal of the carbon not bonded with silicon, strictly following the profile of said micro-cavities.

13. A method according to claim 7, wherein said anchoring substrate is deposited by plasma deposition, which envisages the generation of a plasma jet starting from a carrier gas flow, the material used to make said anchoring substrate being injected in powder form.

14. A method according to claim 13, wherein for the deposition of said anchoring substrate, said powder material comprises powders of one or more non-oxidised metals.

15. A method according to claim 14, wherein said metals are selected from the group comprising Nickel, Aluminium, Chromium and Copper.

16. A method according to claim 7, wherein said protective coating is closely coupled to said braking surface thanks to the micro-roughness correlated to the micro-cavities which are generated by the removal of the carbon not bonded with silicon and are only partly filled by said anchoring substrate, said anchoring substrate mechanically uncoupling said protective coating from said composite ceramic structure.

17. A method according to claim 1, wherein said protective coating is deposited by plasma deposition, which envisages the generation of a plasma jet starting from a carrier gas flow, the material used to make said protective coating being injected in powder form.

18. A method according to claim 17, wherein for the deposition of said protective coating, said powder material comprises oxide powders.

19. A method according to claim 18, wherein said oxides are selected from the group comprising Al2O3, TiO2 and Cr2O3.

20. A method according to claim 1, wherein said deposition is carried out up to obtain a thickness of said protective coating comprised within the range between 200 µm and 700 µm, and preferably within the range between 200 µm and 500 µm.

21. A method according to claim 1, comprising a step of mechanical finishing of said composite ceramic structure, to be carried out after said step of deposition of a protective coating.

22. A method according to claim 21, wherein said mechanical finishing step is carried out to bring the thickness of said coating to a value comprised within the range between 100 µm and 300 µm, and preferably equal to 200 µm.

23. A method for making a composite structure or a portion of a composite structure of a braking band of a brake disc comprising the following steps:
   making a composite ceramic structure, comprising silicon, silicon carbides and carbon not bonded to silicon, obtaining a body of a braking band comprising at least one braking surface, said carbon not bonded to silicon being present substantially in the form of carbon fibre filaments;
   processing said braking surface removing a surface layer so as to have said carbon not bonded with silicon on the surface;
   removing from the surface at least partly and mainly selectively the carbon not bonded with silicon, leaving the silicon and the silicon carbides, thus obtaining at said braking surfaces a surface layer, consisting of silicon and silicon carbide, which exhibits micro-cavities due to the removal of the carbon not bonded with silicon;
   depositing an anchoring substrate of metal material directly on said braking surface from which at least partly and mainly selectively the carbon not bonded with silicon has been removed, said anchoring layer only partly filling said micro-cavities and strictly following the profile of said micro-cavities; and
   depositing a protective coating made with oxides on said anchoring substrate.

* * * * *

UNITED STATES PATENT AND TRADEMARK OFFICE
CERTIFICATE OF CORRECTION

PATENT NO. : 8,147,912 B2  Page 1 of 1
APPLICATION NO. : 12/307707
DATED : April 3, 2012
INVENTOR(S) : Goller et al.

It is certified that error appears in the above-identified patent and that said Letters Patent is hereby corrected as shown below:

On the face of the patent the first inventor's name should be corrected as follows:
(12) "Golleb et al." should read -- Goller et al. --
and
(75) Inventors: "Ralf Siegfried Golleb, Bergamo (IT);" should read -- Ralf Siegfried Goller, Bergamo (IT); --

Signed and Sealed this
Eighth Day of May, 2012

David J. Kappos
*Director of the United States Patent and Trademark Office*